US008869186B2

(12) United States Patent
Bucher et al.

(10) Patent No.: US 8,869,186 B2
(45) Date of Patent: Oct. 21, 2014

(54) AUTOMATED ACQUISITION OF DISCOVERED CONTENT

(75) Inventors: Timothy Bucher, Los Altos, CA (US); Mark A. Ross, San Carlos, CA (US); Timothy C. Nichols, Los Altos, CA (US)

(73) Assignee: Dell Products L.P., Round Rock, TX (US)

( * ) Notice: Subject to any disclaimer, the term of this patent is extended or adjusted under 35 U.S.C. 154(b) by 2130 days.

(21) Appl. No.: 11/193,980

(22) Filed: Jul. 29, 2005

(65) Prior Publication Data
US 2007/0027831 A1   Feb. 1, 2007

(51) Int. Cl.
| H04H 60/32 | (2008.01) |
| H04H 60/63 | (2008.01) |
| H04H 40/90 | (2008.01) |
| G06F 17/30 | (2006.01) |
| H04H 60/37 | (2008.01) |
| H04H 60/74 | (2008.01) |

(52) U.S. Cl.
CPC .......... *G06F 17/30026* (2013.01); *H04H 60/74* (2013.01); *H04H 60/63* (2013.01); *H04H 40/90* (2013.01); *G06F 17/30053* (2013.01); *H04M 2250/64* (2013.01); *H04H 2201/37* (2013.01); *H04H 60/372* (2013.01)
USPC .............................................. 725/18; 725/19

(58) Field of Classification Search
USPC .............................................. 725/10, 18, 19
See application file for complete search history.

(56) References Cited

U.S. PATENT DOCUMENTS

| 7,233,790 | B2 | 6/2007 | Kjellberg et al. |
| 7,454,166 | B2* | 11/2008 | Patsiokas et al. ............ 455/3.06 |
| 2002/0049717 | A1* | 4/2002 | Routtenberg et al. ............ 707/1 |
| 2003/0037157 | A1* | 2/2003 | Pestoni et al. ................ 709/231 |
| 2003/0135857 | A1 | 7/2003 | Pendakur et al. |
| 2005/0251455 | A1* | 11/2005 | Boesen ........................ 705/26 |
| 2006/0095323 | A1* | 5/2006 | Muranami .................... 705/14 |
| 2006/0184675 | A1* | 8/2006 | Salmre et al. ................ 709/227 |
| 2006/0235830 | A1 | 10/2006 | Lin et al. |
| 2007/0010195 | A1* | 1/2007 | Brown et al. ................ 455/3.06 |
| 2007/0022085 | A1 | 1/2007 | Kulkarni |
| 2009/0319672 | A1* | 12/2009 | Reisman ...................... 709/227 |

* cited by examiner

*Primary Examiner* — Nasser Goodarzi
*Assistant Examiner* — Michael Hong
(74) *Attorney, Agent, or Firm* — Brian Tucker; Kirton McConkie

(57) ABSTRACT

Automated acquisition of content including digital media for a device. A device such as a satellite radio can discover content from multiple data stream sources. The device then receives input from a user selecting or identifying specific content to acquire. The device, upon detecting an appropriate network that enables the device to communicate with a remote service or media repository, requests the content using a portion of the specific content such as metadata. The device then receives the content from the service or from the media repository. Often the received content is a higher quality version of the content whereas the portion of the content stored by the device may be lower quality. The user is notified after the content has been acquired.

16 Claims, 2 Drawing Sheets

AUTOMATED ACQUISITION OF DISCOVERED CONTENT

CROSS-REFERENCE TO RELATED APPLICATIONS

Not applicable.

BACKGROUND OF THE INVENTION

1. The Field of the Invention

The present invention relates to acquiring content. More particularly, embodiments of the invention relate to the automated acquisition of discovered content for a device such as a satellite radio.

2. The Relevant Technology

One of the advantages afforded by technological improvements is the ability to distribute to digital media. High quality digital media can be delivered over various types of networks in relatively short time frames. As a result, many different types of devices have been developed to enjoy of the growing availability of digital media. Examples of portable media devices include, for example, digital audio devices (which include MP3 players), portable CD players, portable DVD players, notebook computers, cellular telephones, personal digital assistants, and the like. Digital media can also be enjoyed on other non-portable devices as well.

In addition to these types of portable devices, digital media can also be received over satellite radio. In satellite radio, satellites are used to broadcast digital radio content to subscribers. Through satellite radio, subscribers can receive high quality, uninterrupted, digital data such as radio over more than one hundred different radio channels. The digital media transmitted over satellite radio can include, by way of example, digital quality music, talk radio, sports, news, weather, and the like. Often, a user of satellite radio has a portable device that is used to receive and ultimately play or perform the digital media.

With media devices such as those mentioned above, a user is likely to discover content that the user would like to own or to copy. In satellite radio, for example, a user experiences new content on many different channels and it is likely that the use may discover a song or a talk show that the user would like to listen to again. Unfortunately, most users do not have any control over what is being delivered over the satellite radio and unless the user secures the rights to the content, the user is left waiting for that content to be played again.

Properly owning or licensing the rights associated with digital media typically requires that the user pay for those rights. Unfortunately, the process of acquiring those rights is often an active process that requires substantial user input. Because the process requires active user participation, it is possible that the revenue generated by the content delivered over satellite radio is not maximized as many users may forget, for example, what the content was called before they can purchase it or they may forego the active process of securing the rights to the content because of the active requirements.

For example, the process of purchasing digital media such as a song typically requires substantial input and interaction from the user. Purchasing a song begins when a user actively visits a website through which digital songs are sold. Once the user has accessed the website, the user has to search for the desired song. Once the song has been found and selected, the user is then required to provide payment information. At this point, the song is typically downloaded to the user.

Further, the process of purchasing digital media often occurs from a personal computer, which means that the purchased song is not yet downloaded to the portable audio device. Additional user input is required to select the purchased song and then transfer the purchased song to the user's portable audio device using appropriate software.

The process of procuring digital media for individual use is a process that can require input from the user at various stages during the purchase process. Because the way in which digital media can be delivered and experienced, there exists a need to facilitate the way in which users can obtain and use the rights to their own copies of the digital media.

BRIEF SUMMARY OF THE INVENTION

These and other limitations are overcome by embodiments of the present invention, which relates to systems and methods for acquiring content. More particularly, embodiments of the invention relate to the passive acquisition of content including digital media. Embodiments of the invention can apply to situations where the user acquires permanent rights to the content as well as to situations where the user rents or temporarily accesses the content.

When the user discovers content, the user can provide input to the device that identifies or selects specific content. After the specific content has been selected or otherwise identified by the user, the content can be acquired automatically without further input from the user.

For example, metadata associated with the selected content can be stored by a device and then transmitted to a remote service or media repository once an appropriate network is detected. The metadata can sufficiently identify the content that was selected by the user. Over the detected network or by taking advantage of the bandwidth of a separate network, the content can then be downloaded to the device or to another location or user device. In this manner, a device that can discover content from one or more sources can select and acquire specific content with minimal input from the user.

In one embodiment, a device such as a satellite radio can receive content from multiple data stream sources. As the content is discovered or played by the device, a user discovers the content on a particular channel, for example. The device then receives input from a user selecting content on the device. In one embodiment, the selected content is currently playing on the device. After the content is selected, a portion of the content, such as the metadata, is stored. In one example, a transaction queue is used to store all of the different content selected or identified by the user. Then, the content is automatically acquired from a media repository using, for example, the metadata. After the content is acquired from the media repository, the user is typically notified that the content on the device has been updated with the content from the media repository. In another embodiment, a high quality of the content is simply streamed to the device for playing, but is not actually recorded by the device.

Additional features of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to the acquisition of content including digital media. Embodiments of the invention further relate to the automated acquisition of content. Most devices that can play or perform digital media are typically designed for a particular type of digital media, although many devices can perform multiple functions. Portable audio devices referred to as MP3 players, for example, typically have the ability to play audio files that have been properly encoded. A satellite radio device has the ability to receive digital media from a satellite network and then to play the received digital media.

Because a satellite radio can continually receive content, a user is not limited to a preprogrammed list, but can discover new content. Embodiments of the invention enable a satellite radio to interact with other data sources in addition to satellites. A satellite radio, for example, may be able to connect with and communicate over wireless or wired computer networks in addition to simply receiving digital media from a satellite network. When the user experiences or discovers content that the user likes or desires to acquire or experience for any reason, a simple press of a button (or other user input) can begin the "zero overhead" process of acquiring the selected content that is identified by the press of a button. As a result, a satellite radio may also have the ability to play recorded media. The selected content, for example, may be downloaded to the satellite radio in an encoded format such as mp3.

In satellite radio, the content broadcast to subscribers includes identifiers or metadata that describes the content. The metadata associated with a song, for example, typically includes the artist, song title, and album. One of skill in the art can appreciate that other types of metadata can be included with digital media. When a user presses a button while certain content is playing, the metadata associated with the playing content can be stored by the satellite radio. When the device is within range of an appropriate network, the device initiates the acquisition of the media associated with the stored metadata. The selected media can be downloaded to the device or to another device specified by the user for later use. In addition, the metadata can be used to create a playlist, for example or other useful information.

Figure 1:
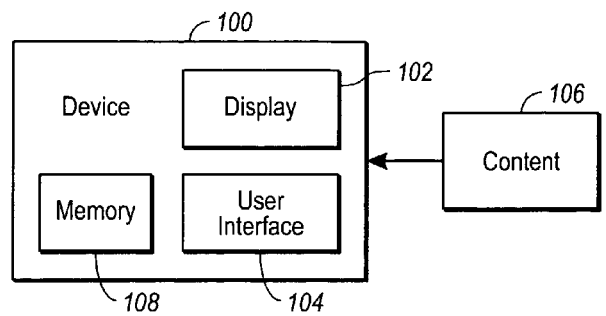
FIG. 1 illustrates one embodiment of a device that receives content and that can play the received content.

FIG. 1 illustrates one embodiment of a device that can receive content including digital media from one or more sources. In this example, the device 100 is representative of both portable and non-portable devices that can receive content 106 that includes digital audio and/or digital video data. Examples of the device 100 may include, by way of example, a satellite radio device, a portable audio player (MP3 player), a portable DVD or CD player, a personal computer, a laptop computer, a cellular telephone, a personal digital assistant, and the like or any combination thereof.

Typically, the device 100 includes a display 102 that can convey information to the user of the device. For example, when the device 100 renders digital audio data, the display 102 may indicate the song title, the artist, the album title, the track number, the length of the track, and the like or any combination thereof. The device 100 also includes a user interface 104 (such as control buttons) or other means of providing input to the device 100. The user interface 104, by way of example, enables a user to navigate and activate the digital media and other content that is stored on the memory 108 of the device 100 or to navigate and perform any digital media or content that is received from an external source. The user interface 104 may enable a user to switch to another channel such as in satellite radio.

The content 106 represents different types of media including digital media that may be received by the device 100. Examples of the content 106 include, but are not limited to, digital music, talk audio data, television data, movie data, podcasts, sports data, and the like or any combination thereof. The content 106 can be either digital or analog in nature.

The memory 108 of the device can be used to store content or other user and/or device data. The memory 108, for example, may store digital music and/or video, graphics, playlists, user preferences, device settings, and the like or any combination thereof.

Figure 2:
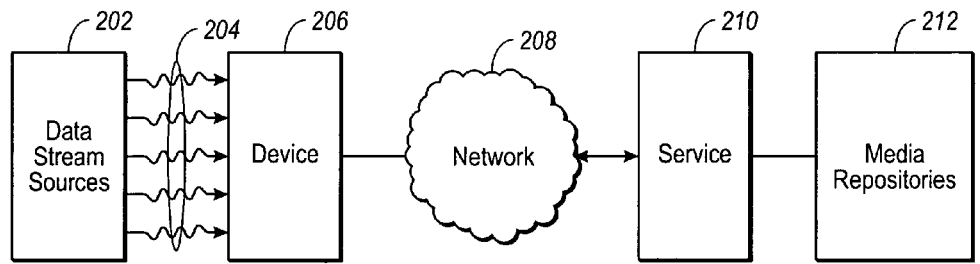
FIG. 2 illustrates one example of an environment for implementing embodiments of the invention.

FIG. 2 illustrates one example of an environment for implementing embodiments of the invention. FIG. 2 illustrates a system 200 that enables a user to discover content and then initiate the automated acquisition of the discovered content. Once the user has selected content, the selected content is automatically acquired and stored on the device or at another location designated by the user. The device 206, which is one example of the device 100, receives one or more of the data streams 204 from data stream sources 202. Exemplary data stream sources 202 include, by way of example, satellite sources including digital radio, wireless computer networks (LAN, WAN, Internet, WiFi, etc.), terrestrial sources, and the like or any combination thereof. The data streams 204 can therefore include broadband data, IP streams, satellite radio, audio and/or video streams, and the like.

The device 206 also has the ability to communicate with a service 210 over a network 208. The network 208 represents any network that is compatible with the device 206 and may include, by way of example, satellite networks, 802.11 networks, personal computer networks (e.g., LAN, WAN), wireless networks (e.g., Bluetooth, WiFi), cellular networks, and the like or any combination thereof. The device 206 may also have the ability to detect when a particular network 208 is available for use. When a network 208 is available, the device 206 can communicate over the network 208 with the service 210 and communicate information that results in digital media being transferred to the device 206.

The service 210 acts as a brokerage that can receive the request for content from the device 206 and then direct the request to the appropriate media repository. The information communicated from the device 206 to the service 210 includes information that enables the service 210 to identify the requested media or other content. The service 210 can then communicate with the various content or media repositories 212 from which the requested content is retrieved. The media repositories 212 may include digital media or other content from, by way of example, online music stores or other sites that provide audio data including sports data and talk data, online video sources including television data and movie data, and the like or any combination thereof.

In one embodiment, content is discovered when a user experiences the content. Audio content, for example, is experienced when played by a device. In the context of satellite radio, satellite content is discovered as the user listens to the content. Changing channels enables the user to discover content on other channels. When the user hears content that they like or wants to record or otherwise obtain, the user can acquire the content as well as the appropriate rights to the content by simply pressing a button or otherwise selecting or identifying the content. The device then uses a portion of the selected content itself and/or metadata associated with the selected content to acquire the content from the appropriate media repository. The transaction typically occurs when the device detects an appropriate connection or network over which the transaction can occur.

Figure 3:
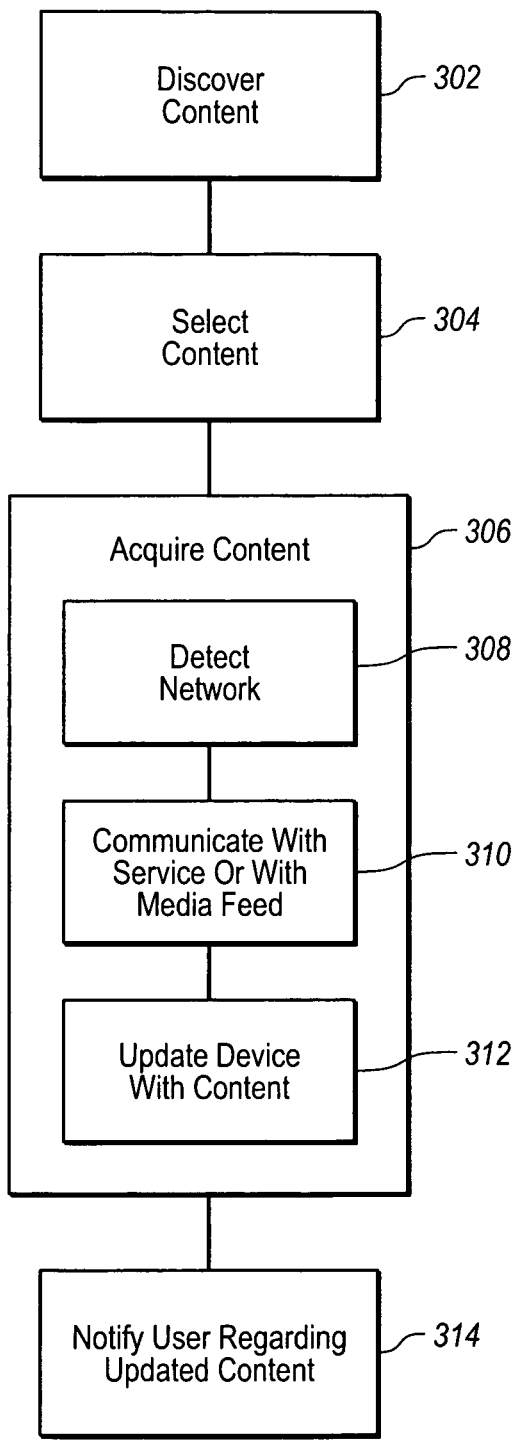
FIG. 3 is a flow diagram of one embodiment of a method for acquiring content discovered on a device.

FIG. 3 illustrates a flow diagram of one embodiment for acquiring content. A user with a device discovers content 302 by listening or playing to a data stream from a data source. The device then receives input from a user selecting content 304. Typically, the input from the user selects content that is currently playing on the device. However, if the data stream previews future content, then that content can be selected as well by storing the metadata used to preview the future content. Further, the user can select previously played content when the device stores a history of content that has been played by the device.

In another embodiment, a user can identify a particular artist, album, and the like. Whenever that artist is discovered or is played by the device, the associated media can be acquired by the device. In this example, content can be acquired without any input from the user.

Selecting content 304 can occur in a variety of ways. When the user selects a button on the device, for example, the currently playing media is recorded and/or the metadata associated with the playing media is recorded or temporarily stored. In some instances, the recorded media may be a lower quality version of the media. This version can be replaced with the purchased higher quality version of the media at a later time. The recorded metadata or media can be used to identify the media or content being acquired. The content recorded by the device can include the metadata, a portion of the content, or the entire content. When purchasing a song or otherwise identifying a song, the song can be identified by the recorded portion even when the metadata is unavailable. In situations where the content does not necessarily have a normal production process (such as in talk radio, sports radio, etc.), the recorded portion can still be used to identify the content. In addition, the user may be given the option of recording every episode of a sports program or of a talk program, for example. The user can review and/or purchase the recorded programs at a later time.

After the content is selected 304, the content is acquired 306. In one embodiment, acquiring the content is automated after the device receives input from the user identifying or selecting content. The device acquires content 306 after detecting 308 an appropriate network. Typically, because the device is both requesting and receiving content, the network should be capable of bi-directional communication. However, the communication from the device and communication to the device do not have to be on the same network. For example, requests from the device may be made over a terrestrial network such as 802.11 based networks, broadband networks, LAN networks, WAN networks, wireless networks, and the like. Data sent to the device can be received over the same networks or delivered to the device over one-way networks such as a satellite network. The appropriate network may also include a personal computer or other device that can connect with the device. For example, a device may connect with a personal computer and then synchronize. The automated acquisition of content can be included as part of the synchronization.

Once an appropriate network has been detected, the device communicates 310 with a service or directly with a media repository to acquire the content. The device sends information (such as the metadata) that identifies the content to the service, which then uses the identifying information to obtain the selected content from the corresponding media repository. Then the device is updated with the selected content 312 and the user is notified 314 regarding the updated content. Alternatively, the selected content may be delivered to a different device. Payment information or account information that facilitates payment may also be included in the communication between the device and the service or the media repository. Notification 314 is an optional step and in some embodiments, the downloaded content is acquired without notification.

For example, the device may store or record a portion of a digital song or the metadata associated with the digital song. The device, after entering or detecting an appropriate network, transmits the metadata and/or the recorded portion of the song or a signature representing the recorded portion of the song or other content to a brokerage service or to a media repository. In response, the requested digital song is then transmitted back to the device over the same network or over another network. The device can then store the digital song in memory for later use. Alternatively, the digital song may be directed to another device or location.

In another embodiment, the user may also be presented with content that is similar to the selected content. The service or the media repository can include suggestions for additional content to the user based on the content selected by the user. Over time, the service and/or the media repository can refine the recommendations or suggestions provided to the user as the user selects additional content. Similar to the automated acquisition of the content, the suggestions or recommendations provided to the user can also be generated and delivered with minimal user input. For example, when the selected content is delivered to the user's device, the metadata displayed to the user can include the recommendations of the service and/or the media repository.

Figure 4:
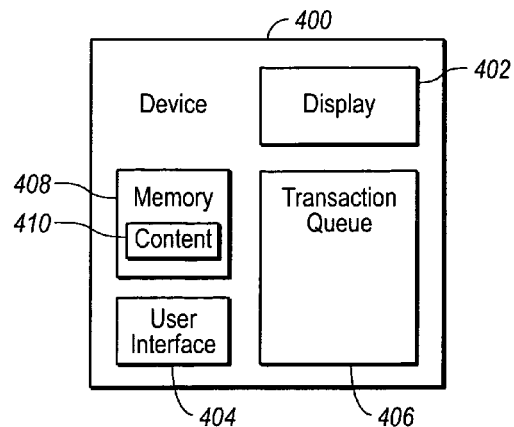
FIG. 4 illustrates a transaction queue used by a device to identify content that has been selected by a user.

FIG. 4 illustrates a device 400, which is another embodiment of the device 100. When selecting content for acquisition, the device 400 may include a transaction queue 406 that stores or otherwise identifies content that has been selected by a user through a user interface 404 (such as a button) or other input means. The transaction queue 406 is typically formed in the memory 408 and includes a representation of the content 410. For example, the queue 406 may contain pointers into the memory 408 where metadata for the selected content are stored. Alternatively, each entry in the transaction queue may include the information necessary to obtain the selected content. Each entry in the transaction queue 406 can be processed in turn or simultaneously once an appropriate network or other connection is detected by the device.

As previously stated, the device 400 may have the ability to record and store content 410. The content 410 may be a lower quality recording and/or may be metadata and/or may be another representation of digital media. Once the higher quality version of the content 410 is obtained, the content 410 may be replaced with the higher quality version.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, at indicated by the appended claims rather than by the foregoing description. All changes which come within the meaning and range of equivalency of the claims are to be embraced within their scope.

What is claimed is:

1. In a system including a device that receives content from one or more data stream sources, a method for acquiring content discovered on the one or more data streams, the method comprising:

rendering content received from a particular data stream source on a device that is connected to a network, the content comprising audio or video content;

while the content is being rendered, receiving input from a user requesting that a copy of the content be obtained;

in response to the input, obtaining a copy of the content by:
  (1) recording at least a portion of the content, wherein the recorded content is a low quality version of the content;
  (2) sending the recorded content over a network to a service for comparison of the recorded content to stored content such that the recorded content is sent over the network in response to the input requesting that a copy of the content be obtained and for the purpose of identifying which content was recorded by the device;
  (3) receiving a copy of the content, the copy comprising a higher quality version of the content; and
  (4) replacing the recorded low quality version of the content with the received higher quality version of the content on the device;

receiving a recommendation for additional content similar to the identified content such that the additional content is recommended based on the recorded content that was sent over the network; and displaying the recommendation for additional content in conjunction with the copy of the content.

2. A method as defined in claim 1, wherein the copy of the content is received over a different network than the content received from the particular data stream source.

3. A method as defined in claim 1, wherein the copy of the content is received from a media repository with which the service communicates.

4. A method as defined in claim 1, wherein the network is one or more of an 802.11 network, a wireless network, a broadband network, a one way terrestrial network, a cellular network, a personal computer, a LAN, a WAN, the Internet, and a satellite network.

5. A method as defined in claim 1, wherein the content is at least one of a digital song, digital talk, digital sports, a digital video, or digital television.

6. A method as defined in claim 1, wherein the content comprises an episode and wherein the method further comprises, in response to the user input, recording each episode of the content.

7. A method as defined in claim 6, further comprising providing the user with the option to at least one of review, rent or purchase each episode.

8. In a system including a device that receives radio broadcasts, a method performed by the device for acquiring content included in the radio broadcast, the method comprising:

receiving a radio broadcast at the device, the radio broadcast being received over a first radio network;

rendering content of the radio broadcast;

receiving user input while the content is being rendered, the user input requesting that a copy of the content be obtained;

recording the content on the device, wherein the recorded content is a low quality version of the content;

storing the recorded content in a transactional queue;

detecting a second network that enables the device to communicate with a service;

in response to detecting the second network, retrieving the recorded content from the transitional queue;

sending the recorded content to the service over the second network, wherein the recorded content is sent to request that the service:

(1) identify which content was recorded; and
(2) locate a copy of the content that is of higher quality than the recorded content;
receiving a copy of the content, the copy comprising a higher quality version of the content;
replacing the recorded low quality version of the content with the received higher quality version of the content;
receiving a recommendation for additional content similar to the identified content such that the additional content is recommended based on the recorded content that was sent over the network; and
displaying the recommendation for additional content in conjunction with the copy of the content.

9. A method as defined in claim 8, wherein the copy of the content is received from a media repository with which the service communicates.

10. A method as defined in claim 8, wherein detecting a second network that enables the device to communicate with a service further comprises detecting one or more of: an IP network, and 802.11 based network, a terrestrial network, a LAN, a WAN, a terrestrial network, or a cellular network.

11. A method as defined in claim 8, further comprising sending the copy of the content to a separate device.

12. A method as defined in claim 8, further comprising notifying the user when the copy of the content is received.

13. A method as defined in claim 8, further comprising:
receiving a recommendation for additional content similar to the content.

14. A method as defined in claim 8, wherein the content is one or more of audio data, video data, talk data, sports data, weather data, or any combination thereof.

15. A method as defined in claim 8, wherein the content comprises an episode and wherein the method further comprises, in response to the user input recording each episode of the content.

16. A non-transitory computer readable medium having computer executable instructions for implementing a method for acquiring content included in a radio broadcast, the method comprising:
receiving a radio broadcast at the device, the radio broadcast being received over a first radio network;
rendering content of the radio broadcast, the content comprising a first episode of a plurality of episodes;
receiving user input while the content is being rendered, the user input requesting that a copy of the content be obtained;
recording the content on the device, wherein the recorded content is a low quality version of the content;
storing the recorded content in a transactional queue;
detecting a second network that enables the device to communicate with a service;
in response to detecting the second network, retrieving the recorded content from the transitional queue;
sending the recorded content to the service over the second network, wherein the recorded content is sent to request that the service:
(1) identify which content was recorded; and
(2) locate a copy of the content that is of higher quality than the recorded content;
receiving a copy of the content, the copy comprising a higher quality version of the content;
replacing the recorded low quality version of the content with the received higher quality version of the content;
in response to sending the recorded content to the service, receiving a recommendation to purchase other episodes of the plurality of episodes;
receiving user input that requests purchase of the other episodes; and
receiving the other episodes for storage on the device.

* * * * *